US 8,559,333 B2

(12) United States Patent
Diab et al.

(10) Patent No.: US 8,559,333 B2
(45) Date of Patent: Oct. 15, 2013

(54) METHOD AND SYSTEM FOR SCALABLE SWITCHING ARCHITECTURE

(75) Inventors: Wael Diab, San Francisco, CA (US); Yongbum Kim, San Jose, CA (US); Bruce Currivan, Dove Canyon, CA (US); Jeyhan Karaoguz, Irvine, CA (US); Kenneth Ma, Cupertino, CA (US); Michael Johas Teener, Santa Cruz, CA (US)

(73) Assignee: Broadcom Corporation

( * ) Notice: Subject to any disclaimer, the term of this patent is extended or adjusted under 35 U.S.C. 154(b) by 450 days.

(21) Appl. No.: 12/690,280

(22) Filed: Jan. 20, 2010

(65) Prior Publication Data

US 2011/0019585 A1    Jan. 27, 2011

Related U.S. Application Data

(60) Provisional application No. 61/228,340, filed on Jul. 24, 2009.

(51) Int. Cl.
*H04L 12/28* (2006.01)

(52) U.S. Cl.
USPC ........................................................ 370/254

(58) Field of Classification Search
USPC ........................................................ 370/254
See application file for complete search history.

(56) References Cited

U.S. PATENT DOCUMENTS

| | | | | |
|---|---|---|---|---|
| 5,649,001 A | * | 7/1997 | Thomas et al. | 379/93.07 |
| 6,721,872 B1 | * | 4/2004 | Dunlop et al. | 712/28 |
| 7,453,892 B2 | * | 11/2008 | Buskirk et al. | 370/401 |
| 8,145,746 B1 | * | 3/2012 | Singh et al. | 709/224 |
| 2002/0029303 A1 | * | 3/2002 | Nguyen | 709/327 |
| 2003/0016624 A1 | * | 1/2003 | Bare | 370/217 |
| 2006/0036795 A1 | * | 2/2006 | Leach | 710/305 |
| 2006/0245422 A1 | * | 11/2006 | Willhite et al. | 370/359 |
| 2007/0067481 A1 | * | 3/2007 | Sharma et al. | 709/231 |
| 2009/0190653 A1 | * | 7/2009 | Seo et al. | 375/240.01 |
| 2009/0228684 A1 | * | 9/2009 | Ramesh et al. | 712/29 |
| 2010/0161894 A1 | * | 6/2010 | Singh | 711/108 |
| 2011/0064078 A1 | * | 3/2011 | Jain et al. | 370/390 |

* cited by examiner

*Primary Examiner* — Mark Rinehart
*Assistant Examiner* — Christopher R Crompton
(74) *Attorney, Agent, or Firm* — Brinks Hofer Gilson & Lione

(57) ABSTRACT

A switching fabric, within a network switching device, may comprise a plurality of dedicated interface modules to enable the switching fabric to interface with a plurality of switching support subsystems. The switching support subsystems may comprise a memory subsystem, a content address memory (CAM) subsystem, a packet processing subsystem, and a physical layer (PHY) subsystem. The switching fabric may be operable to determine capacity and/or capability of each of the plurality of switching support subsystems; and to configure each of the plurality of dedicated interface modules based on the determined capacity and/or capability of a corresponding switching support subsystem. The switching fabric also comprises an inter-switch interface module to enable coupling the network switching device to a plurality of other network switching devices, to form a multi-device switching mesh that enable sharing of resources and/or aggregation of switching capabilities of the network switching devices.

14 Claims, 7 Drawing Sheets

METHOD AND SYSTEM FOR SCALABLE SWITCHING ARCHITECTURE

CROSS-REFERENCE TO RELATED APPLICATIONS/INCORPORATION BY REFERENCE

This patent application makes reference to, claims priority to and claims benefit from U.S. Provisional Application Ser. No. 61/228,340 filed on Jul. 24, 2009.

FEDERALLY SPONSORED RESEARCH OR DEVELOPMENT

[Not Applicable].

MICROFICHE/COPYRIGHT REFERENCE

[Not Applicable].

FIELD OF THE INVENTION

Certain embodiments of the invention relate to networking. More specifically, certain embodiments of the invention relate to a method and system for scalable switching architecture.

BACKGROUND OF THE INVENTION

The growth of networking and systems' connectivity are some of the major developments in recent decades. Fewer and fewer systems and devices are operated as stand-alone entities, and most of today's systems are increasingly becoming elements in complex networks. This growth in networking allows improved performance and increased flexibility. For example, personal computers (PCs) and other specialized devices including, for example, printers, audiovisual devices and other devices, are connected together as nodes in computer networks. Networks are designated in a variety of ways, and based on a variety of factors. Network designation may be spatial, based on the scope of connectivity among the network nodes. For example, a network may be designated as a personal area network (PAN), a local area network (LAN), and wide area network (WAN). Network designation may also be based on the backbone connecting technology. For example, a network may be designated as an Ethernet network, a wireless network, and/or a fiber optical network. Some networks are circuit switched and are built around dedicated node-to-node connectivity, wherein a dedicated circuit is created and reserved, when needed, between the communicating nodes. Other nodes are then barred from utilizing the same connection and/or other entities in the network to the extent necessary to maintain the circuit. Most networks in use nowadays, however, are based on packet switched networks. In packet switched networks, the sending node simply transmits traffic that is destined for one or more receiving nodes. The traffic comprises packets that contain, in addition to data, other information that enables directing the packets to the receiving nodes. For example, most of today's networks are Internet based network and utilizes various protocols comprising TCP/IP, for example, to facilitate packet switching. In this regard, data is encapsulated into packets that comprise a header portion and a payload portion to enable transporting, addressing and/or routing among various entities within or coupled to the network.

Network switching devices, comprising such devices as switches, routers and/or hubs, are utilized in networks to facilitate forwarding of traffic between sending and receiving nodes. Hubs contain multiple ports, wherein packets arriving at one port are transmitted via all remaining ports. Consequently, hubs are generally operable to perform minimal processing. Switches also comprise multiple ports, but unlike hubs, switches are more actively functional in performing routing operations. For example, switches maintain routing information that enables the switches to examine received packets and process them accordingly to determine whether the packets are transmitted via the switch, and if so, to determine the appropriate ports to perform that transmission. Switches may store, generate, and/or maintain addressing related information of accessible network nodes.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for scalable switching architecture, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for scalable switching architecture. In various embodiments of the invention, a switching fabric, within a network switching device, may comprise a plurality of dedicated interface modules that enables the switching fabric to interface with a plurality of switching support subsystems. The switching support subsystems may comprise a memory subsystem, a content address memory (CAM) subsystem, a packet processing subsystem, and a physical layer (PHY) subsystem. The switching fabric may be operable to determine capacity and/or capability of each of the plurality of switching support subsystems, and to configure each of the plurality of dedicated interface modules based on the determined capacity and/or capability of a corresponding switching support subsystem. The capacity and/or capability of each of the plurality of switching support subsystems may be determined based on a number, a type, and/or capabilities of constituent devices within the switching support subsystem. The switching fabric may be operable to dynamically reconfigure each of the plurality of dedicated interface modules when capacity and/or capability of a corresponding switching support subsystem is changed.

The switching fabric may also be operable to couple the network switching device to a plurality of other network switching devices to form a multi-device switching mesh. The switching fabric may comprise an inter-switch interface module to enable the coupling the network switching device to the plurality of network switching devices. The multi-device switching mesh may enable sharing of resources and/or aggregation of switching capabilities of the network switching devices, which may facilitate balancing load of the network switching devices. The inter-switch interface module may be utilized to communicate messages and/or data between the network switching device and the one or more other network switching devices in the multi-device switching mesh via the inter-switch interface module. This may enable sharing of resources and/or aggregating of switching capabilities in the multi-device switching mesh. An inter-switch database may be utilized to manage switching operations via the multi-device switching mesh. The inter-switch database may be used to track packets routed via the multi-device switching mesh to facilitate reception, storage, retrieval, processing, and/or transmission of the packets via the multi-device switching mesh. The inter-switch database may be generated, used, and/or modified based on communication between the network switching devices via inter-switch interface modules.

Figure 1A:
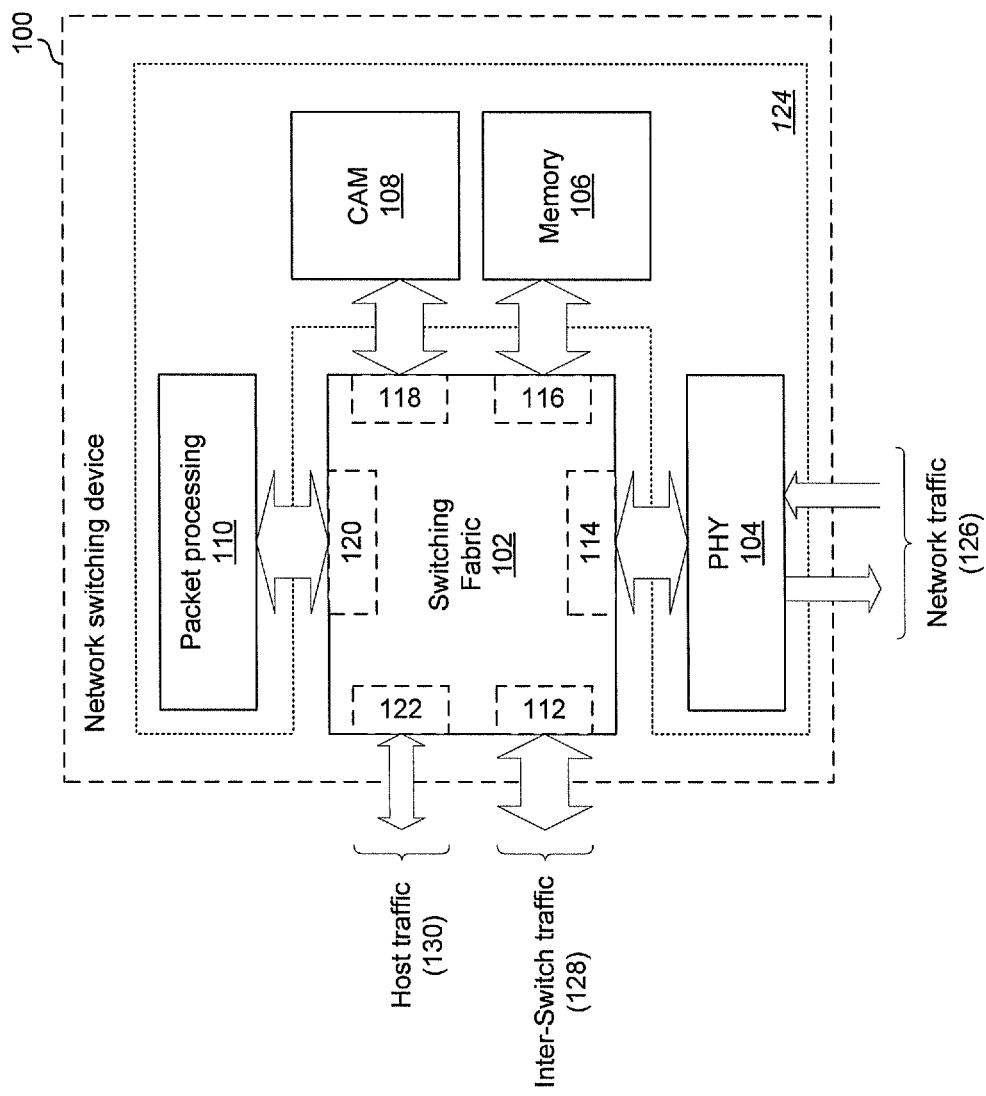
FIG. 1A is a block diagram that illustrates an exemplary network switching device which uses standardized interfaces between switching fabric and supporting subsystems, in accordance with an embodiment of the invention.

FIG. 1A is a block diagram that illustrates an exemplary network switching device which uses standardized interfaces between switching fabric and supporting subsystems, in accordance with an embodiment of the invention. Referring to FIG. 1A, there is shown a network switching device 100, a switching fabric 102, a physical layer (PHY) subsystem 104, a memory subsystem 106, a content address memory (CAM) subsystem 108, and a packet processing subsystem 110.

The network switching device 100 may be operable to perform various switching functions and/or operations in a network. Exemplary network switching devices such as the network switching device 100 may comprise routers and/or switches. Switching operations may be performed by one or more networking layers based on, for example, the Open Systems Interconnection (OSI) Model. For example, the network switching device 100 may be operable to perform L2, L3, and/or L4 switching. The network switching device 100 may comprise, for example, the switching fabric 102, a plurality of switching support subsystems 124, which may comprise the physical layer (PHY) subsystem 104, the memory subsystem 106, the CAM subsystem 108, the packet processing subsystem 110, and/or suitable logic, circuitry, interfaces, and/or code that may be operable to perform switching operations to facilitate reception, processing, and/or transmission of networking packets to facilitate communication of the packets between two or more networking nodes.

The switching fabric 102 may comprise suitable logic, circuitry, interfaces, and/or code that may be operable to route network traffic via the network switching device 100. The switching fabric 102 may be utilized, for example, to enable reception of packets, via one or more ports in the PHY subsystem 104, from sending network nodes; and/or transmission of packets via one or more ports in the PHY subsystem 104, to one or more receiving network nodes, to facilitate network traffic switching operations via the network switching device 100. The switching fabric 102 may comprise a PHY interface 114, a memory interface 116, a CAM interface 118, and/or a packet processing interface 120. These interfaces may enable coupling of the switching fabric 102 to the PHY subsystem 104, the memory subsystem 106, the CAM subsystem 108, and the packet processing subsystem 110, respectively.

The PHY interface 114 may comprise suitable logic, circuitry, interfaces, and/or code that may enable providing interfacing function between the switching fabric 102 and the PHY subsystem 104. The PHY interface 114 may be operable to support configurable and/or expandable PHY interfacing via the switching fabric 102 by enabling, for example, coupling a variable number and/or types of PHY devices, subsystems, and/or cards to the switching fabric 102. The PHY interface 114 may enable interactions between PHY functionality performed via the PHY subsystem 104, and corresponding medium access control (MAC) functionality within the switching fabric 102. In this regard, the PHY interface 114 may be based on, for example, the Reduced Media Independent Interface (RMII), the Gigabit Media Independent Interface (GMII), the Reduced Gigabit Media Independent Interface (RGMII), the Serial Gigabit Media Independent Interface (SGMII), the Quad Serial Gigabit Media Independent Interface (QSGMII), the 10 Gigabit Media Independent Interface (XGMII), the 40 Gigabit Media Independent Interface (XLGMII), and/or the 100 Gigabit Media Independent Interface (CGMII) standard.

The memory interface 116 may comprise suitable logic, circuitry, interfaces, and/or code that may be operable to provide one or more interfacing functions between the switching fabric 102 and the memory subsystem 106. The memory interface 116 may be operable to support configurable and/or expandable memory interfacing via the switching fabric 102 by enabling, for example, coupling a variable number and/or types of memory devices and/or subsystems to the switching fabric 102.

The CAM interface 118 may comprise suitable logic, circuitry, interfaces, and/or code that may be operable to provide one or more interfacing functions between the switching fabric 102 and the CAM subsystem 108. The CAM interface 118 may be implemented to support configurable and/or expandable CAM interfacing via the switching fabric 102 by enabling, for example, coupling a variable number and/or types of CAM devices and/or subsystems to the switching fabric 102. The packet processing interface 120 may comprise suitable logic, circuitry, interfaces, and/or code that may enable providing interfacing function between the switching fabric 102 and the packet processing subsystem 110. The packet processing interface 120 may be operable to support configurable and/or expandable packet processing interfacing via the switching fabric 102 by enabling, for example, coupling a variable number and/or types of packet processing devices and/or subsystems to the switching fabric 102.

The switching fabric 102 may also comprise an inter-switch interface 112 and/or a host interface 122. The inter-switch interface 112 may be utilized to enable coupling the network switching device 102 to one or more other network switching devices. The inter-switch interface 112 may comprise suitable logic, circuitry, interfaces, and/or code that may be operable to provide one or more interfacing functions between the network switching device 100, via the switching fabric 102, and one or more other switching devices that may be similarly configurable to support inter-switch communication. In this regard, the inter-switch interface 112 may be operable to exchange information, messaging, and/or packets between a plurality of network switching devices. In addition, the switching fabric may comprise a host interface 122, which may be utilized to facilitate user interactions with the network switching device 100. In this regard, the host interface 122 may enable receiving user commands and/or transmitting user feedback during configuration of the network switching device 100.

The host interface 122 may be operable to provide interfacing with the switching fabric 102, and/or other components of the network switching device 100 that may interface with the switching fabric 102, by a user (e.g. administrator). In this regard, the host interface 122 may enable downloading software upgrades into the network switching device 100. The host interface 122 may also enable receiving and/or sending, via the host traffic 130, configuration parameters, user commends, and/or status information.

The PHY subsystem 104 may comprise suitable logic, circuitry, interfaces, and/or code that may be operable to provide one or more physical layer (PHY) network interactions in the network switching device 100. For example, the PHY subsystem 104 may be operable to receive and/or transmit Ethernet (IEEE 802.3) packets that may be routed via the network switching device 100. In this regard, the memory subsystem 106 may comprise a plurality of PHY cards, each of which may comprise a plurality of ports that may facilitate external network interfacing functionality, in the network switching device 100, based on one or more networking standards and/or protocols. The PHY subsystem 104 may comprise, for example, 10/100/1000 Mbps and/or multigigabit Ethernet ports. The PHY subsystem 104 may also comprise ports supporting non-conventional speeds. In an exemplary embodiment of the invention, the PHY subsystem 104 may support 10, 40, and/or 100 Gigabit Ethernet based operations.

The memory subsystem 106 may comprise suitable logic, circuitry, interfaces, and/or code that may enable permanent and/or non-permanent storage and/or fetch of data, code and/or other information used in network switching device 100. In this regard, the memory subsystem 106 may comprise one or more memory devices of different memory technologies, including, for example, read-only memory (ROM), random access memory (RAM), and/or Flash memory. The memory subsystem 106 may be utilized via the switching fabric 102, for example, to store packets received via the PHY subsystem 104, which may subsequently be retrieval for transmission via the PHY subsystem 104.

The CAM subsystem 108 may comprise suitable logic, circuitry, interfaces, and/or code that may store and/or maintain search data for packets received by switching fabric, via the PHY subsystem 104. In this regard, the CAM subsystem 108 may be used to define and/or apply various rules when accessing packets in memory. The CAM subsystem 108 may be operable, for example, to generate and/or use multi-fields tables that may be populated whenever a network packet is received. The multi-fields tables may comprise such parameters and/or properties as MAC source and/or destination address, which may be associated with received packets. The tables may also comprise indexing information that may enable determining the location in memory subsystem 106 where the packets may be stored during switching operations in the network switching device 100.

The packet processing subsystem 110 may comprise suitable logic, circuitry, interfaces, and/or code that may enable processing of packets received by the switching fabric, via the PHY subsystem 104. In this regard, the packet processing subsystem 110 may enable generating and/or modifying, for example, packet headers of network packets routed via the network switching device 100 in the course of L3 and/or L4 wrapper processing functions. The invention need not be limited to a specific type of processors, and the packet processing subsystem 110 may comprise for example, general purpose processors, specialized processors or any combination of suitable hardware, firmware, software and/or code, which may be enabled processing packets during switching operations in the network switching device 100.

In operation, the network switching device 100 may be utilized to perform network switching operations, to facilitate, for example, routing of network packets between a plurality of network nodes. The network switching device 100 may be utilized, for example, in a local area network (LAN), to enable transfer of network packets between network nodes in the LAN. Network packets may be received, for example, via ports in the PHY subsystem 104 from a sending network node. The received network packets may be stored in the memory subsystem 106 until the packets may be ready for transmission to a receiving network node, via ports in the PHY subsystem 104. During switching operations in the network switching device 100, some processing of the received and/or the transmitted packets may be performed. For example, depending on whether L2, L3, and/or L4 based switching services are provided via the network switching device 100, at least some L2, L3, and/or L4 encapsulation or wrapping may be performed. At least some of the processing may be performed via dedicated functionality in the packet processing subsystem 110. For example, the switching fabric 102 may be operable to only perform L2 wrapper processing while L3 and/or L4 wrapper processing functions may be performed via the packet processing subsystem 110. Packet processing may comprise, for example, examining appropriate header data and/or information in received packets to determine source and/or destination address information, which may then be used to determine proper routing operations.

Routing operations may be performed based on, for example, access control list (ACL) information that may be maintained and/or updated in the network switching device 100. During such ACL based routing operations, the CAM subsystem 108 may, for example, enable more efficient search and/or matching operations during packet routing. For example, while the memory subsystem 106 may enable only storage and/or retrieval of routed packets based on storage index data, the CAM subsystem 106 may be operable to enable content based storage and/or retrieval of such packets. The CAM subsystem 108 may be operable to generate and/or update search data comprising multiple fields to track and search received packets while the packet payloads may still be stored in the memory subsystem 106. Accordingly, the CAM subsystem 108 may be used to search through stored packets, using configurable search criteria that may comprise any subset of these searchable fields, during routing operation.

In an exemplary aspect of the invention, the network switching device 100 may incorporate modularized design and/or scalable and expandable architecture, wherein the switching capabilities of the network switching device 100 may be changed by modifying and/or adjusting the capabilities and/or parameters of the switching fabric 102 and/or one or more of subsystems in the network switching device 100. In this regard, the structure and/or operations of the switching fabric 102, the PHY subsystem 104, the memory subsystem 106, the CAM subsystem 106, and/or the packet processing subsystem 110 may be modified and/or reconfigured. The modification and/or reconfiguration may be performed by interacting with the switching fabric 102, via the host interface 122 for example, wherein the PHY interface 114, the memory interface 116, the CAM interface 118, and/or the processing interface 170 may be utilized, by the switching fabric 102, to communicate necessary reconfiguration related messaging to and/or from corresponding supporting subsystems. During any such reconfiguration, different number and/or types of constituent devices within each supporting subsystem may be removed and/or added. For example, the switching fabric 102 may be designed and/or implemented to supported a maximum switching throughput via the network switching device 100; and one or more of the PHY interface 114, the memory interface 116, the CAM interface 118, and/ or the packet processing interface 120 may support configurable and/or expandable interfacing functionality in the switching fabric 102 up to the maximum switching throughput. The switching fabric 102 may be designed, for example, to support 100 Gigabit based switching operations. Accordingly, the PHY interface 114, memory interface 116, CAM interface 118, and/or packet processing interface 120 may be designed and/or implemented such that they may be operable to support up to the maximum required PHY, memory, CAM, and/or packet processing interfacing needed to support the maximum switching throughput of the network switching device 100.

The PHY interface 114, memory interface 116, CAM interface 118, and/or packet processing interface 120 may nonetheless other configurations that may be less than the maximum throughput. For example, the PHY interface 114, memory interface 116, CAM interface 118, and/or packet processing interface 120 may be implemented such that each interface may support various configurations based on variable number, type, and/or capabilities of corresponding devices and/or subsystems. For example, while the PHY interface 114 may be capable of supporting PHY interfacing necessary to enable 100 Gigabit based switching, the PHY interface 114 may be configured differently to support PHY interfacing that may correspond to the actual available maximum throughput and/or capabilities of the PHY subsystem 104. Where the PHY subsystem 104 may only be operable to provide 10 Gigabit switching, the PHY interface 114 may be configured to provide only 1/10 of potential interfacing capability. The PHY interface 114 may also be configured differently based on the various possible implementations that may be used for the PHY subsystem 104. For example, while parallel based implementation may be desirable for the PHY subsystem 104—i.e., parallel slots that may be populated with variable number of PHY cards; the PHY interface 114 may also be configurable to support serial implementation of the PHY subsystem 104. In such serial implementations, one or more serial links may be used in conjunction with speed bumps, which may enable running these serial links at various speeds, including, for example, 100 megabit, 1 gigabit, and 10 gigabit.

The switching fabric 102 may determine the actual maximum throughput of the network device 100, and may configure the PHY interface 114, the memory interface 116, the CAM interface 118, and/or the packet processing interface 120 to accommodate such actual maximum throughput. For example, in instances where the number, type, and/or capability of memory devices in the memory subsystem 106 may limit the switching throughput to 1 gigabit, the switching fabric 102 may configure the PHY interface 114, the memory interface 116, the CAM interface 118, and/or the packet processing interface 120 to reflect that throughput. Determining actual maximum throughput may be made based on operator input, configuration data, and/or dynamically by monitoring capabilities of each of the PHY subsystem 104, the memory subsystem 106, the CAM subsystem 108, and the packet processing subsystem 110, via, for example, the PHY interface 114, memory interface 116, CAM interface 118, and/or packet processing interface 120.

Figure 1B:
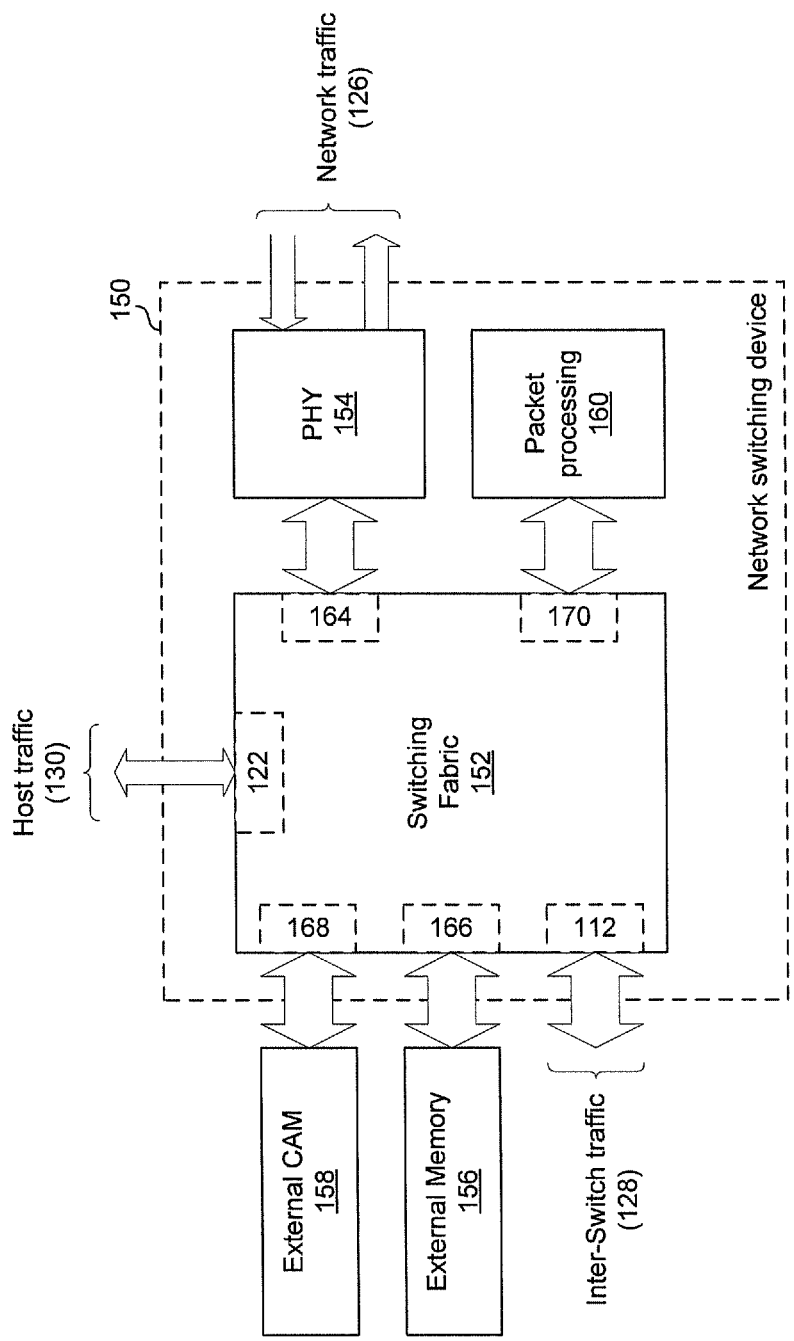
FIG. 1B is a block diagram that illustrates an exemplary network switching device which uses standardized interfaces between switching fabric and supporting internal subsystems and/or external storage systems, in accordance with an embodiment of the invention.

FIG. 1B is a block diagram that illustrates an exemplary network switching device which uses standardized interfaces between switching fabric and supporting internal subsystems and/or external storage systems, in accordance with an embodiment of the invention. Referring to FIG. 1B, there is shown a network switching device 150, a switching fabric 152, a physical layer (PHY) subsystem 154, an external memory subsystem 156, an external content address memory (CAM) subsystem 158, and a packet processing subsystem 160.

The network switching device 150 may be operable to perform various switching functions and/or operations in a network, similar to the network switching device 100, substantially as described with regard to, for example, FIG. 1A. The network switching device 150 may comprise suitable logic, circuitry, interfaces, and/or code that may be operable to perform switching operations to facilitate reception, processing, and/or transmission of networking packets during switching operations. For example, the network switching device 150 may comprise the switching fabric 152 and a plurality of internal switching support subsystems, which may comprise the physical layer (PHY) subsystem 154 and/ or the packet processing subsystem 160. The network switching device 150 may also be operable to utilize the external memory subsystem 156 and/or the external CAM subsystem 158, which may be shared with other network switching devices.

The switching fabric 152 may be similar to the switching fabric 102, substantially as described with regard to, for example, FIG. 1A, and may, similarly, comprise suitable logic, circuitry, interfaces, and/or code that may be operable to enable and/or support routing of network traffic via the network switching device 150. The switching fabric 152 may comprise a PHY interface 164, a memory interface 166, a CAM interface 168, and/or a packet processing interface 170. These interfaces may enable coupling of the switching fabric 152 to the PHY subsystem 154, the external memory subsystem 156, the external CAM subsystem 158, and the packet processing subsystem 160, respectively.

The PHY interface 164 may be similar to the PHY interface 104, substantially as described with regard to, for example, FIG. 1A, and may be operable to support configurable and/or expandable PHY interfacing via the switching fabric 152 by enabling, for example, coupling a variable number and/or types of PHY devices and/or cards to the switching fabric 152. The packet processing interface 170 may be similar to the packet processing interface 110, substantially as described with regard to, for example, FIG. 1A, and may be operable to support configurable and/or expandable packet processing interfacing via the switching fabric 152 by enabling, for example, coupling a variable number and/or types of packet processing devices to the switching fabric 152. The memory interface 166 may be similar to the memory interface 106, substantially as described with regard to, for example, FIG. 1A, and may provide interfacing functionality between the switching fabric 152 and the external memory subsystem 156. In this regard, the memory interface 166 may support configurable and/or expandable memory interfacing in the switching fabric 152 in conjunction with the scalable structure of the external memory subsystem 156. The CAM interface 168 may be similar to the CAM interface 108, substantially as described with regard to, for example, FIG. 1A, and may be operable to provide interfacing functionality between the switching fabric 152 and the external CAM subsystem 158. In this regard, the CAM interface 168 may support configurable and/or expandable CAM interfacing in the switching fabric 152 in conjunction with the scalable structure of the external CAM subsystem 158. The switching fabric 152 may also comprise the inter-switch interface 112 and/or the host interface 122.

The PHY subsystem 154 may be similar to the PHY subsystem 104, substantially as described with regard to, for example, FIG. 1A, and may similarly comprise suitable logic, circuitry, interfaces, and/or code operable to provide physical layer (PHY) network interactions in the network switching device 150. The PHY subsystem 154 may be operable, for example, to receive and/or transmit Ethernet (IEEE 802.3) packets that may be routed via the network switching device 150 via a plurality of PHY ports. The packet processing subsystem 160 may be similar to the packet processing subsystem 110, substantially as described with regard to, for example, FIG. 1A, and may similarly comprise suitable logic, circuitry, interfaces, and/or code that may support processing of packets routed via the switching fabric 152. In this regard, the packet processing subsystem 160 may enable generating and/or modifying, for example, packet headers of network packets routed via the network switching device 100 in the course of L3 and/or L4 wrapper processing functions.

The external memory subsystem 156 may comprise suitable logic, circuitry, interfaces, and/or code that may enable permanent and/or non-permanent storage and/or fetch of data, code and/or other information used by network switching device 150 and/or other network switching devices. In this regard, the external memory subsystem 156 may comprise one or more memory devices of different memory technologies, including, for example, read-only memory (ROM), random access memory (RAM), and/or Flash memory. The external memory subsystem 156 may support configurable and/or expandable storage functionality. In this regard, the external memory subsystem 156 may support variable number and/or types of memory devices. Consequently, the external memory subsystem 156 may be utilized by the switching fabric 152, via the memory interface 166, to store and/or retrieve packets that maybe received and/or sent via the PHY subsystem 154.

The external CAM subsystem 158 may comprise suitable logic, circuitry, interfaces, and/or code that may store and/or maintain search data for packets routed via the network switching device 150 and/or other network switching devices. In this regard, the external CAM subsystem 158 may be used to define and/or apply various rules when accessing packets stored in and/or retrieved from the external memory subsystem 156. The external CAM subsystem 158 may support configurable and/or expandable CAM functionality. In this regard, the external CAM subsystem 158 may support variable number and/or types of CAM devices and/or systems.

In operation, the network switching device 150 may be utilized to perform network switching operations, to facilitate, for example, routing of network packets between a plurality of network nodes, similar to the network switching device 100, substantially as described with regard to, for example, FIG. 1A. During switching operations in the network switching device 150, received network packets may be stored in the external memory subsystem 156 until the packets may be ready for transmission, via ports in the PHY subsystem 154 for example. At least some processing of received and/or transmitted network packets may be performed via the packet processing subsystem 160. For example, the switching fabric 152 may be operable to only perform L2 wrapper processing while L3 and/or L4 wrapper processing functions may be performed via the packet processing subsystem 160. Routing operations may be performed based on, for example, access control list (ACL) information that may be maintained and/or updated by the network switching device 150. During such ACL based routing operations, the external CAM subsystem 158 may provide more efficient search and/or matching operations for storage operations—i.e., storage and/or retrieval of routed packets into and/or from the external memory subsystem 156. For example, while the external memory subsystem 156 may enable only storage and/or retrieval of routed packets based only on memory address parameters, the CAM subsystem 156 may be operable to enable content based storage and/or retrieval of such packets, substantially as described with regard to FIG. 1A.

In an exemplary aspect of the invention, the network switching device 150 may incorporate modularized design and/or scalable and expandable architecture, wherein the switching capabilities of the network switching device 150 may be changed by modifying and/or adjusting the capabilities and/or parameters of the switching fabric 152 and/or one or more of subsystems in the network switching device 150, substantially as described with regard to the networking switching device 100 in FIG. 1A. In addition, the switching capabilities of the network switching device 150 may also be expanded and/or adjusted by modifying the structure and/or capabilities of external supporting subsystems, such as the external memory subsystem 156 and/or the external CAM subsystem 158. In this regard, increasing storage capacity available via the external memory subsystem 156, by adding more and/or using different types of memory devices, may allow for increase in the switching capabilities (e.g., speed and/or capacity) of the network switching device 150. Similarly, improving the CAM functionality available via the external CAM subsystem 158, by adding more CAM devices and/or adjusting the ACL rules defined and/or used via the external CAM subsystem 158, may allow for increase in the switching capabilities of the network switching device 150.

Figure 2A:
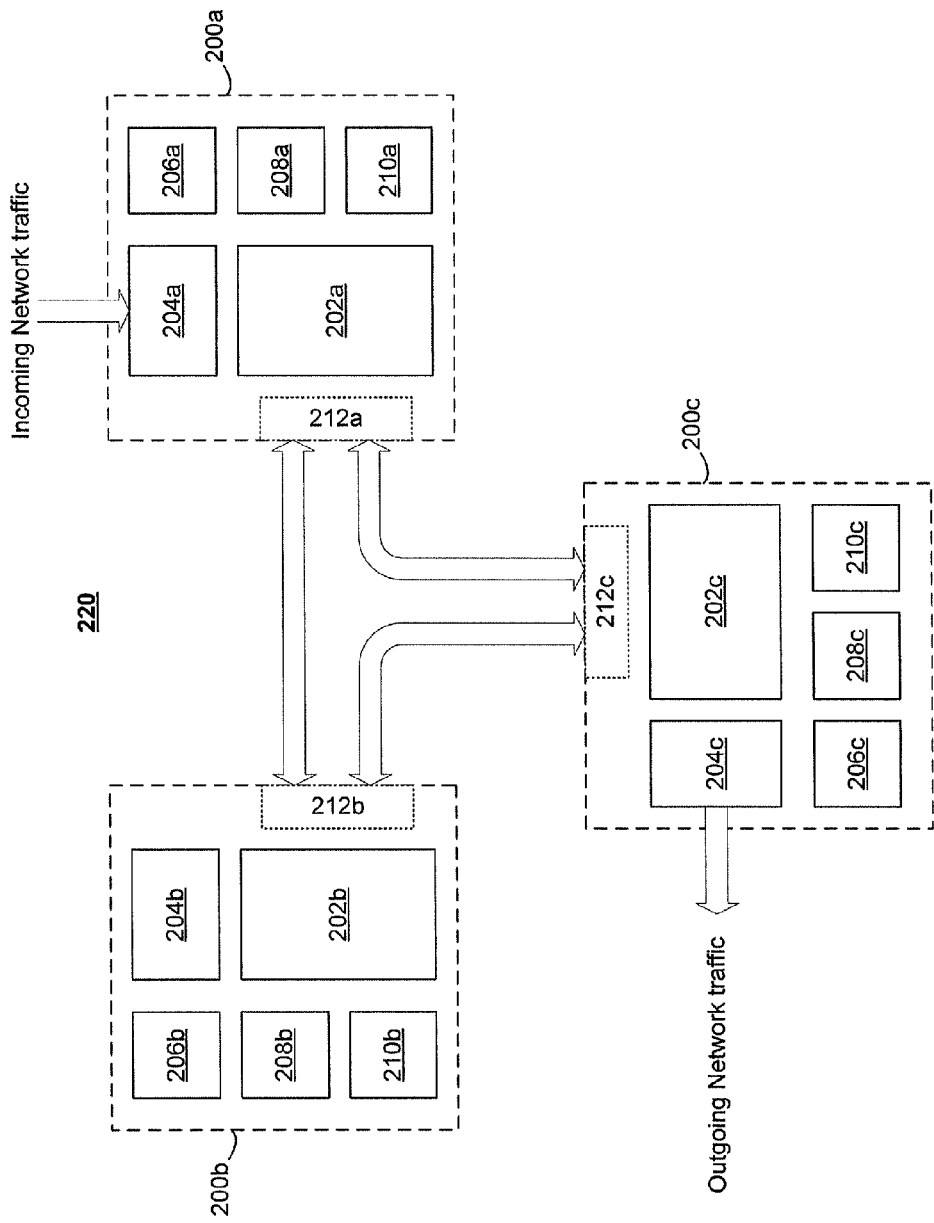
FIG. 2A is a block diagram that illustrates an exemplary multi-device switching mesh that comprises a plurality of network switching devices which share supporting subsystems during switching operations, in accordance with an embodiment of the invention.

FIG. 2A is a block diagram that illustrates an exemplary multi-device switching mesh that comprises a plurality of network switching devices which share supporting subsystems during switching operations, in accordance with an embodiment of the invention. Referring to FIG. 2A, there is shown a plurality of network switching devices 200a, 200b, and 200c.

Each of the network switching devices 200a, 200b, and 200c may be similar to the network switching device 100, substantially as described with regard to, for example, FIG. 1A. The network switching devices 200a, 200b, and 200c may comprise, similar to the network switching device 100 as described in FIG. 1A, switching fabric 202a, 202b, and 202c, respectively, each of which may be similar to the switching fabric 102. The network switching devices 200a, 200b, and 200c may also comprise, similar to the network switching device 100, physical layer (PHY) subsystems 204a, 204b, and 204c, each of which may be similar to the PHY subsystem 104; memory subsystems 206a, 206b, and 206c, each of which may be similar to the memory subsystem 106; content address memory (CAM) subsystems 208a, 208b, and 208c, each of which may be similar to the CAM subsystem 108; and packet processing subsystems 210a, 210b, and 210c, each of which may be similar to the packet processing subsystem 110.

The network switching devices 200a, 200b, and 200c may also comprise inter-switch interface modules 212a, 212b, and 212c, respectively, each of which may be similar to the inter-switch interface 112, substantially as described with regard to FIG. 1A. The inter-switch interface modules 212a, 212b, and 212c may be operable to enable inter-switch communication among the network switching devices 200a, 200b, and 200c. In this regard, the inter-switch interface modules 212a, 212b, and 212c may enable the network switching devices 200a, 200b, and 200c to form multi-device switching mesh 220, which may be operable to provide switching operations and/or services using the network switching devices 200a, 200b, and 200c. Accordingly, the inter-switch interface modules 212a, 212b, and 212c may be utilized, in accordance with the invention, to provide configurable and/or expandable switching systems by enable connecting multiple network switching devices, where new network switching devices may be added as demand for higher switching throughput may arise.

In operation, each of the network switching devices 200a, 200b, and/or 200c may be utilized to perform network switching operations, to facilitate, for example, routing of network packets between a plurality of network nodes. For example, the network switching device 200a may be utilized to route network packets communicated between remote and/or local network nodes. Network packets may be received, for example, via ports in the PHY subsystem 204a from a sending network node, and/or transmitted to receiving network nodes via ports in the PHY subsystem 204a. The network packets may be stored in the memory subsystem 206a during routing operations, while the switching fabric 204a and/or the packet processing subsystem 210a may provide necessary processing of received and/or transmitted packets may be performed, which may comprise, for example, L2, L3, and/or L4 wrapper processing operations. In addition, the CAM subsystem 206a may be operable to provide and/or enable content based storage, search, and/or retrieval of network packets during switching operations in the network switching device 200a. The network switching devices 200b and/or 200c may be similarly operable in switching operations.

In an exemplary aspect of the invention, the multi-device switching mesh 220 may provide modularized and/or scalable and expandable switching services, wherein a plurality of network switching devices may be combined to aggregate switching capabilities, with the ability to support adding more network switching devices, to provide increased throughput and/or faster switching. For example, the plurality of network switching devices 200a, 200b, and 200c may utilize inter-switch communication, via the inter-switch interface modules 212a, 212b, and 212c, to create the multi-device switching mesh 220, which may be operable to enable providing switching operations using the network switching devices 200a, 200b, and 200c. The multi-device switching mesh 220 may enable the network switching devices 200a, 200b, and 200c to share resources and/or capability to optimize switching operations. The inter-switch connectivity may be used to, for example, enable load balance in the multi-device switching mesh 220. For example, where memory subsystem 206a storage space may be substantially used up by stored packets, inter-switch connectivity between the network switching devices 200a and 200b, via links between inter-switch interface modules 212a and 212b, may enable use of the memory subsystem 206b in the network switching device 200b to store packets received, processed, and/or transmitted via the network switching device 200a. During switching operations in the multi-device switching mesh 220, network packets routed through the multi-device switching mesh 220 may processed and/or pass through multiple network switching devices as the received into the multi-device switching mesh 200 and then forwarded out of it. The network packets may be processed differently by each network switching device during such routing. For example, the network packet may not be handled by a given network switching device; it may be simply be forwarded to one or more specific network switching devices, and/or or the network packet may be processed in similar manner as in typical switching operations. Various methods and/or techniques may be utilized to determine how network packets are handled by each network switching device during routing operations in the multi-device switching mesh 220. For example, predefined values for the EtherType field in the Ethernet header may be set by each network switching device to indicate to subsequent network switching devices how to process the network packets as it is processed via the multi-device switching mesh 220. Alternatively, a new wrapper (e.g. header) may be added to network packets while they are moved within multi-device switching mesh 220. The new wrapper header may comprise information that may specify how each network switching device may handle the network packet. The network switching devices 200a, 200b, and/or 200c may also exchange control messages, utilizing predefined structure, to indicate how network packets are handled as they are processed within the multi-device switching mesh 220.

The inter-switch connectivity may also be operable to optimize switching operations in the multi-device switching mesh 220 based on capabilities of the individual devices. The network switching devices 200a, 200b, and 200c may have, for example, varying storage, cataloging, and/or processing capabilities based on the capabilities of their memory subsystems, CAM subsystems, and/or packet processing storage. Consequently, the inter-switch connectivity may enable dividing the various tasks necessary to perform switching operations among the network switching device 200a, 200b, and/or 200b based on their capabilities, to improve and/or maximize switching throughput via the multi-device switching mesh 220. For example, during such exemplary switching operations, network packets may be received via the PHY subsystem 204a, in the network switching device 200a, and may then be stored in the memory subsystem 206a.

The CAM subsystem 208b, in the network switching device 200b, may be deemed to provide better capabilities, and may therefore be utilized to generate and/or update content related information corresponding to the packets received and stored in the network switching device 200a. Based on routing tables, which may available via the network switching device 200b, it may be determined that network switching device 200c may be better suited to transmit the packets. Accordingly, the packet processing subsystem 210c may retrieve the packets stored in memory subsystem 206a, based on the search and/or match information provided via the CAM subsystem 208b. The packet processing subsystem 210c may process the retrieved packets, to perform L3 wrapper processing for example, and the processed packets may then be transmitted via the PHY subsystem 204c. Inter-switching connectivity via the inter-switch interface modules 212a, 212b, and 212c may enable exchange of relevant control messaging and/or packets between the switching device 200a, 200b, and 200c during these operations.

In an exemplary embodiment of the invention, an inter-switch database may be generated and/or maintained in the multi-device switching mesh 220, to enable tracking packets during switching operations using the network switching devices 200a, 200b, and/or 200b. The inter-switch database may be populated and/or updated to indicate, for example, addressing information of received packets, and/or to indicate where the packets are stored within the multi-device switching mesh 220. The inter-switch database may be maintained in one of the network switching devices 200a, 200b, and 200b; and may be accessible via inter-switch connectivity via the inter-switch interface modules 212a, 212b, and 212c.

Figure 2B:
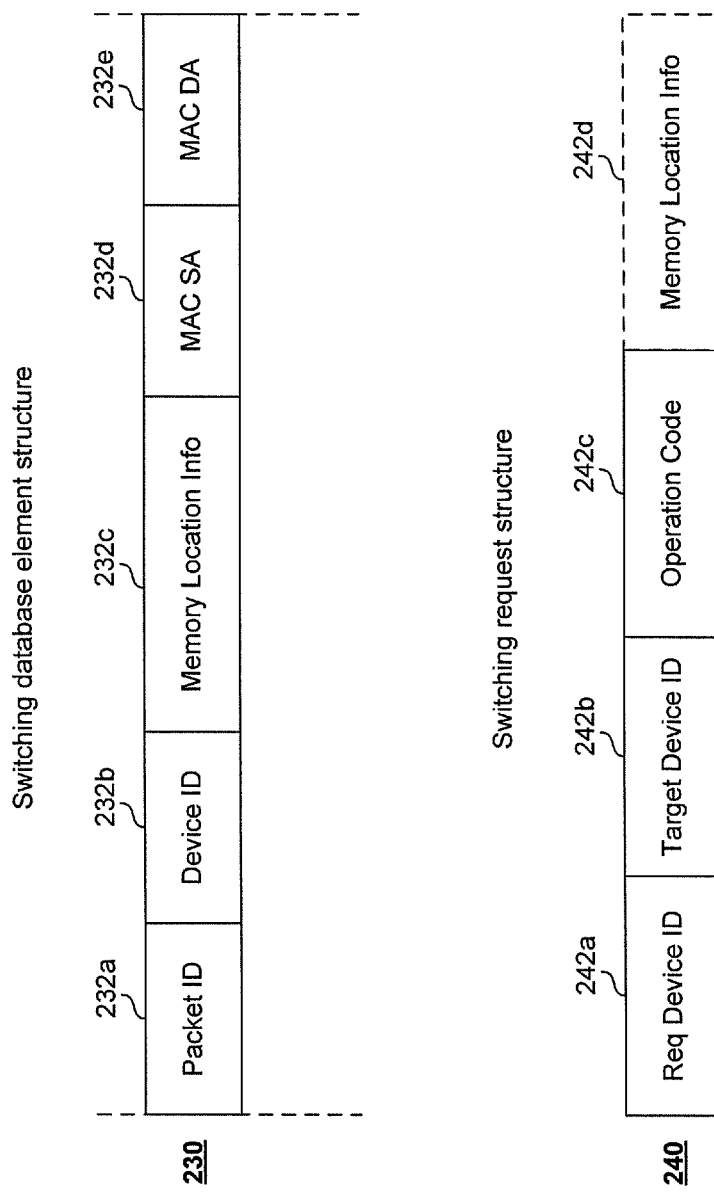
FIG. 2B is a block diagram that illustrates exemplary structures of element in an inter-switch database and/or switching requests, which may be utilized in a multi-device switching mesh, in accordance with an embodiment of the invention.

FIG. 2B is a block diagram that illustrates exemplary structures of elements in an inter-switch database and/or switching requests, which may be utilized in a multi-device switching mesh, in accordance with an embodiment of the invention. Referring to FIG. 2B, there is shown an inter-switch database element 230, which may be utilized in conjunction with inter-switch communication and/or operations in a multi-device switching mesh, for example the multi-device switching mesh 220 of FIG. 2A. Also shown is a switching request 240, which may be communicated between switching network devices to facilitate performing switching operations in a multi-device switching mesh, for example the multi-device switching mesh 220 of FIG. 2A.

The inter-switch database element 230 may comprise a plurality of fields that may be used to enable tracking handling of network packets during switching operations. For example, the inter-switch database element 230 may comprise a packet identifier (ID) field 232a, a device identifier (ID) field 232b, a memory location information field 232c, a MAC source address field 232d, and MAC destination address field 232e.

The switching request 240 may comprise a plurality of fields that may be set and/or used via a network switching device to specify one or more operations that may be performed by other network switching devices during switching operations in a multi-device system. For example, the switching request 240 may comprise a requesting device identifier (ID) field 240a, a target device identifier (ID) field 240b, operation code field 240c, and a location information field 240d.

In operation, a plurality of the inter-switch database element 230 may be utilized to construct a database that may enable tracking packets handled in the multi-device switching mesh 220, during switching operations using the network switching devices 200a, 200b, and/or 200b for example. For example, when a packet is received via the network switching device 200a, a new instance of the inter-switch database element 230 (or an available existing instance) may be populated and/or modified to indicate the reception of the network packet. The packet ID field 232 may be updated with identification information extracted from appropriate header and/or payload fields in the received network packet. The device ID field 232b may be updated to identify the device where the received network packet is stored. For example, in instances where the received network packet is stored in memory subsystem 206a in the network switching device 200a, the device ID field 232b may be updated with the identifier parameter used to identify the network switching devices 200a within the multi-device switching mesh 220. The memory location information field 232c may be updated with location data to enable locating a received network packet with the memory subsystem 206a.

In some embodiments, the memory location information field 232c may also comprise data that correspond to CAM entries that may be used in conjunction with the receive network packet during search and/or match operation using one or more the CAM subsystems in the multi-device switching mesh 220. The MAC source address field 232d and the MAC destination address field 232e may be updated from corresponding header and/or payload addressing fields in the received network packet. The MAC source address field 232d and/or the MAC destination address field 232e may be utilized, for example, to enable routing decisions and/or related processing operations during switching in the multi-device switching mesh 220.

Instances of the switching request 240 may be generated and/or exchanged among network switching device in a multi-device switching mesh, for example the network switching devices 200a, 200b, and 200c of the multi-device switching mesh 220, during switching operations within the multi-device switching mesh. For example, when a network packet is received via the network switching device 200a, the network switching device 200a may generate two instances of the switching request 240 that are sent to the network switching devices 200b and 200c. In each instance, the requesting device ID field 240a may be set, based on preconfigured values for example, to indicate the network switching device 200a. The target device ID field 240b may be set to indicate the network switching devices 200b and 200c, respectively. The operation code field 240c may be set to indicate specific actions that may be requested from the target network switching devices. For example, in the instance of the switching request 240 sent to the network switching device 200b, the operation code field 240c may be set to indicate that the network switching device 200b is to store the corresponding network packet in its memory subsystem 206b. In the instance of the switching request 240 sent to the network switching device 200c, the operation code field 240c may be set to indicate that the network switching device 200c is to retrieve the corresponding network packet from the memory subsystem 206b and to send it via its PHY subsystem 204b. In this regard, the location info field 240d may be set to indicate where the network packet is located within the memory subsystem 206b.

Figure 2C:
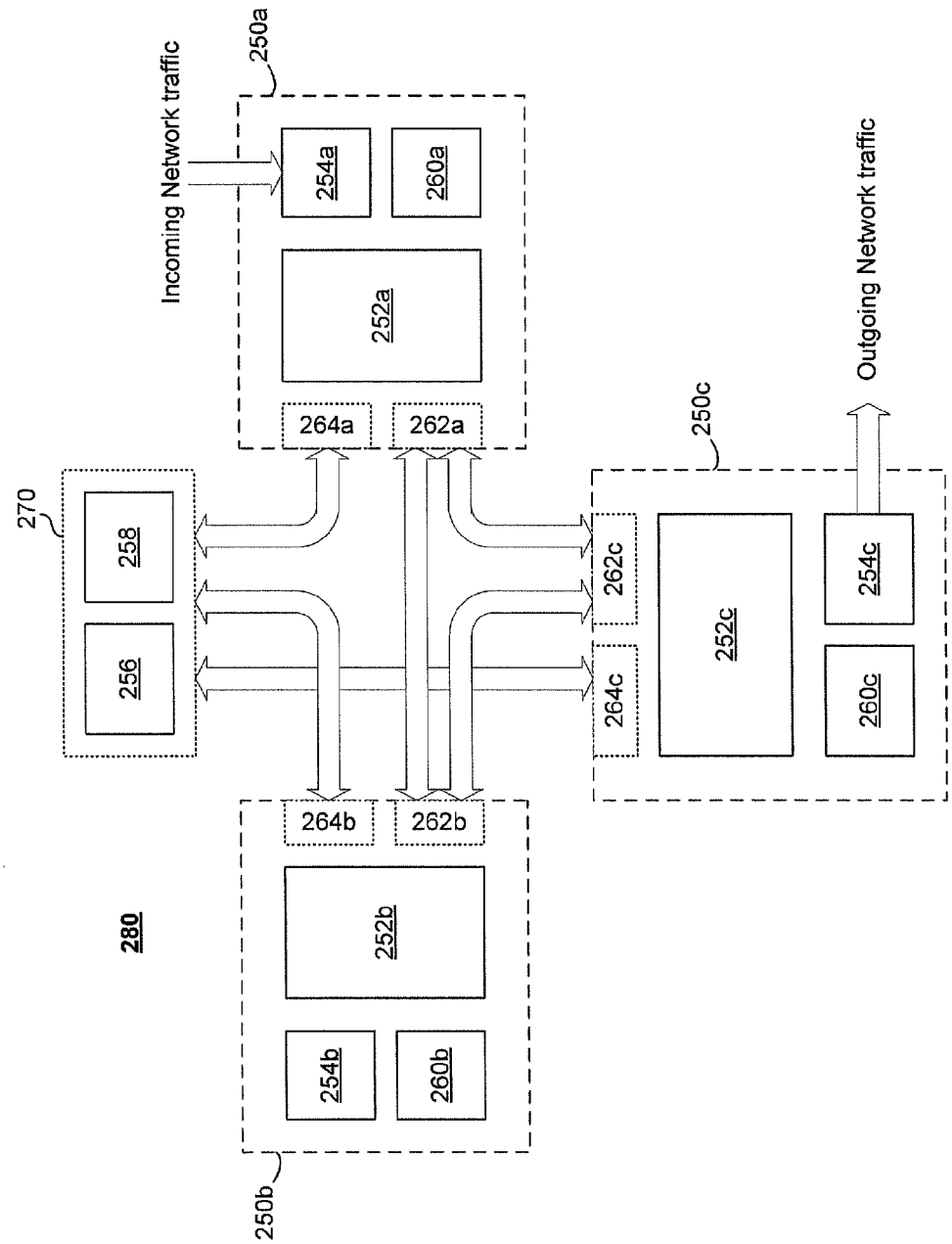
FIG. 2C is a block diagram that illustrates an exemplary multi-device switching mesh that comprises a plurality of network switching devices which share internal supporting subsystems and a common external storage subsystem during switching operations, in accordance with an embodiment of the invention.

FIG. 2C is a block diagram that illustrates an exemplary multi-device switching mesh that comprises a plurality of network switching devices which share internal supporting subsystems and a common external storage subsystem during switching operations, in accordance with an embodiment of the invention. Referring to FIG. 2C, there is shown a plurality of network switching devices 250a, 250b, and 250c.

Each of the network switching devices 250a, 250b, and 250c may be similar to the network switching device 150, substantially as described with regard to, for example, FIG. 1B. The network switching devices 250a, 250b, and 250c may comprise, similar to the network switching device 150 as described in FIG. 1B, switching fabric 252a, 252b, and 252c, respectively, each of which may be similar to the switching fabric 152. The network switching devices 250a, 250b, and 250c may also comprise, similar to the network switching device 150, physical layer (PHY) subsystems 254a, 254b, and 254c, each of which may be similar to the PHY subsystem 154; and packet processing subsystems 260a, 260b, and 260c, each of which may be similar to the packet processing subsystem 160. Also shown in FIG. 2C is a common storage system 270 comprising an external memory subsystem 256, which may be similar to the memory subsystem 156; and a content address memory (CAM) subsystem 258, each of which may be similar to the CAM subsystem 158.

The network switching devices 250a, 250b, and 250c may also comprise inter-switch interface modules 262a, 262b, and 262c, respectively, each of which may be similar to the inter-switch interface 112, substantially as described with regard to FIGS. 1A and/or 1B. The inter-switch interface modules 262a, 262b, and 262c may be operable to enable inter-switch communication among the network switching devices 250a, 250b, and 250c. In this regard, the inter-switch interface modules 262a, 262b, and 262c may enable the network switching devices 250a, 250b, and 250c to form multi-device switching device 280, which may be operable to provide switching operations and/or services using the network switching devices 250a, 250b, and 250c. The network switching devices 250a, 250b, and 250c may also comprise storage interface modules 264a, 264b, and 264c, respectively, which may be operable to enable interactions with the common storage system 270. In this regard, each of the storage interface modules 264a, 264b, and 264c may combine the functionality of the memory interface 166 and the CAM interface 168, substantially as described with regard to FIG. 1B. The storage interface modules 264a, 264b, and 264c may enable each of the network switching devices 250a, 250b, and 250c to store and/or retrieve network packets in and/or from the common storage system 270. Accordingly, the inter-switch interface modules 262a, 262b, and 262c, and/or the storage interface modules 264a, 264b, and 264c may be utilized, in accordance with the invention, to provide configurable and/or expandable multi-device switching meshes by enabling connecting multiple network switching devices, where new network switching devices may be added as demand for higher switching throughput may arise.

In operation, each of the network switching devices 250a, 250b, and/or 250c may be utilized to perform network switching operations, to facilitate, for example, routing of network packets between a plurality of network nodes, substantially as described with regard to FIG. 1B.

In an exemplary aspect of the invention, the network switching devices 250a, 250b, and 250c may be combined, along with the common storage system 270, to form the multi-device switching mesh 280, which may provide modularized and/or scalable and expandable switching services, substantially as described with regard to the multi-device switching mesh 220 of FIG. 2A. In the multi-device switching mesh 280, however, packet networks routed via the multi-device switching mesh 280 may be stored and/or retrieved from the centralized common storage system 270, specifically in the memory subsystem 256. In addition, the common storage system 270 may enable centralizing the CAM operations necessary during switching operations in the multi-device switching mesh 280.

Figure 3A:
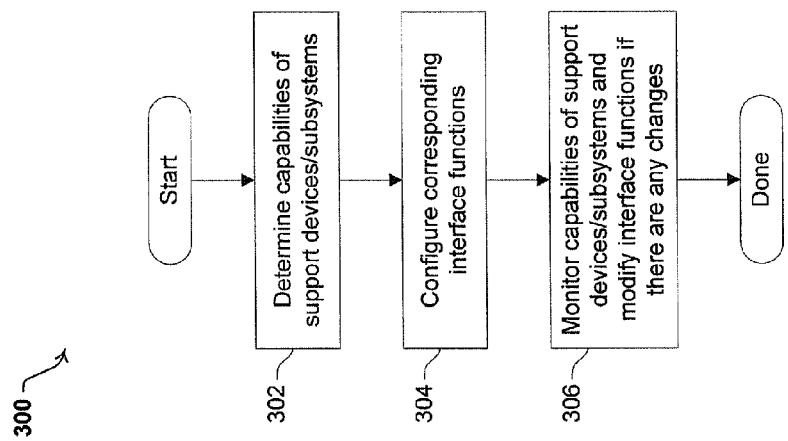
FIG. 3A is a block diagram that illustrates an operations of switching fabric in an exemplary network switching device, which uses standardized interfaces to provide configurable switching capabilities, in accordance with an embodiment of the invention.

FIG. 3A is a block diagram that illustrates operation of switching fabric in an exemplary network switching device, which uses standardized interfaces to provide configurable switching capabilities, in accordance with an embodiment of the invention. Referring to FIG. 3A, there is shown a flow chart 300 comprising a plurality of exemplary steps that may be utilized for configuring standardized interfaces in switching fabric in a network switching device.

In step 302, capabilities of support subsystems in a networking device may be determined. For example, the switching fabric 102 in the network switching device 100 may be operable to determine the capabilities of the PHY subsystem 104, the memory subsystem 106, the CAM subsystem 108, and/or the packet processing subsystem 110. The capabilities of each of these subsystems may depend, for example, on number, type, and capabilities of corresponding devices that may be incorporated into the subsystems. For example, the PHY subsystem 104 may be operable to support a variable number of PHY cards, and thus capabilities of the PHY subsystem 104 may be dictated by the number, type, and/or capabilities of used PHY cards. In step 304, interface functions corresponding to support subsystems may be configured. For example, once the capabilities of the PHY subsystem 104, the memory subsystem 106, the CAM subsystem 108, and/or the packet processing subsystem 110 are determined, the switching fabric 102 may configure the PHY interface 114, the memory interface 116, the CAM interface 118, and/or the packet processing interface 120 to reflect and/or accommodate the capabilities of the PHY subsystem 104, the memory subsystem 106, the CAM subsystem 108, and/or the packet processing subsystem 110; and/or the actual maximum switching throughput available via network switching device 100. The actual maximum switching throughput may be determined and/or limited by the capabilities of the various subsystems in the device. In step 306, the capabilities of support devices/subsystems may be monitored, and corresponding interface functions may be modified if wherever changes are detected.

Figure 3B:
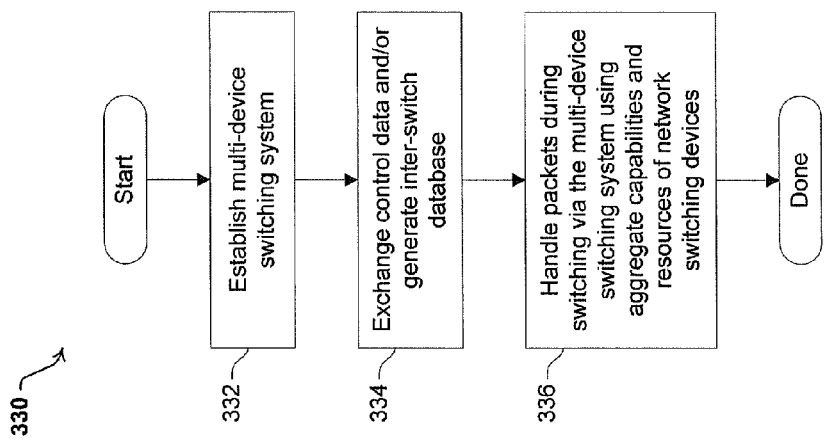
FIG. 3B is a block diagram that illustrates an operations of multi-device switching mesh that enable sharing of switching resources between a plurality of network switching devices, in accordance with an embodiment of the invention.

FIG. 3B is a block diagram that illustrates an operations of multi-device switching mesh that enable sharing of switching resources between a plurality of network switching devices, in accordance with an embodiment of the invention. Referring to FIG. 3B, there is shown a flow chart 330 comprising a plurality of exemplary steps that may be utilized to provide switching operations via a multi-device switching mesh In step 332, a multi-device switching mesh may be established using a plurality of inter-connected network switching devices. For example, the multi-device switching mesh 220 may be established using the network switching devices 200a, 200b, and 200c. The inter-switch connectivity between the network switching devices 200a, 200b, and 200c may be provided via the inter-switch interfaces 212a, 212b, and 212c, which may enable exchange of control data, messaging, and/or packet between the network switching devices 200a, 200b, and 200c during switching operations via the multi-device switching mesh 220.

In step 334, control data may be exchanged and/or an inter-switch database may be generated within the multi-device switching mesh to facilitate switching operations. For example, in the multi-device switching mesh 220, the network switching devices 200a, 200b, and 200c may exchange control data and/or messaging to indicate capabilities and/or availability of various subsystems in the network switching devices. The network switching devices 200a, 200b, and 200c may exchange, for example, information regarding the capabilities of the PHY subsystems 204a, 204b, and 204c; the memory subsystems 206a, 206b, and 206c; the CAM subsystems 208a, 208b, and 208c; and/or the packet processing subsystems 210a, 210b, and 210c. The information exchange may enable generation of control policies that determine how packets are handled in the multi-devices switching system 220 during switching operations. In addition, an inter-switch database may be generated in the multi-device switching mesh 220, to enable tracking of packets during switching operations using the network switching devices 200a, 200b, and/or 200b. The inter-switch database may be populated and/or updated to indicate, for example, where the packets are stored within the multi-device switching mesh 220, where they may be processed, and/or to show addressing information of received packets.

In step 336, packets may be handled during switching operations via the multi-device switching mesh 220 using aggregated capabilities and resources of network switching devices, based on, for example, generated control policies. In addition, during packet handling, the inter-switch database may enable tracking managing, and/or handling of packets in the multi-device switching mesh 220. For example, instances of the inter-switch database element 230 may be generated and/or used for received packets, to store such information as packet identifiers, MAC source and/or destination address information, and/or information that identify the network switching device where the packets (or the payloads of the packets) during switching operations in the multi-device switching mesh 220.

Various embodiments of the invention may comprise a method and system for scalable switching architecture. The switching fabric 102 in the network switching device 100 may comprise a plurality of interface modules that enable interfacing with the plurality of switching support subsystems 124. The plurality of switching support subsystems 124 may comprise the PHY subsystem 104, the memory subsystem 106, the CAM subsystem 108, and/or the packet processing subsystem 110. The switching fabric 102 may comprise, for example, the PHY interface 114, the memory interface 116, the CAM interface 118, and/or the packet processing interface 120, which may enable the switching fabric 102 to interface with the PHY subsystem 104, the memory subsystem 106, the CAM subsystem 108, and/or the packet processing subsystem 110. The switching fabric 102 may be operable to determine capacity and/or capability of each of the PHY subsystem 104, the memory subsystem 106, the CAM subsystem 108, and the packet processing subsystem 110, and to configure each of the PHY interface 114, the memory interface 116, the CAM interface 118, and/or the packet processing interface 120 based on the determined capability and/or capability of the corresponding switching support subsystem. The capacity and/or capability of each of the PHY subsystem 104, the memory subsystem 106, the CAM subsystem 108, and/or the packet processing subsystem 110 may be determined based on a number, a type, and/or capabilities of constituent devices within the switching support subsystem. The switching fabric 102 may be operable to dynamically reconfigure each of the plurality of dedicated interface modules when capacity and/or capability of a corresponding switching support subsystem is changed. The switching fabric 102 may also comprise the inter-switch interface 112, which may enable the coupling the network switching device 100, via the switching fabric 102, to a plurality of network switching devices.

The multi-device switching mesh 220 may be formed by grouping the plurality of network switching devices; for example the network switching devices 200a, 200b, and 200c. The multi-device switching mesh 220 may enable sharing of resources and/or aggregation of switching capabilities of the network switching devices 200a, 200b, and/or 200c, which may facilitate balancing load of the network switching devices 200a, 200b, and/or 200c. The inter-switch interfaces 212a, 212b, and/or 212c may be utilized to enable the network switching devices 200a, 200b, and/or 200c to exchange messaging and/or data during switching operations in the multi-device switching mesh 220. An inter-switch database, comprising a plurality of the inter-switch database element 230 may be utilized to manage switching operations via the multi-device switching mesh 220. The inter-switch database may be used to track packets routed via the multi-device switching mesh 220, via instances of the inter-switch database element 230, to facilitate reception, storage, retrieval, processing, and/or transmission of the packets via the multi-device switching mesh 220. The inter-switch database may be generated, used, and/or modified based on communication between the network switching devices 200a, 200b, and/or 200c via the inter-switch interfaces 212a, 212b, and/or 212c.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for scalable switching architecture.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A network switching device comprising:
a physical (PHY) interface configurable in response to received PHY configuration parameters for data communication with a selectable number of physical layer devices;
a memory interface configurable in response to received memory configuration parameters for data communication with a selectable number or type of memory subsystems, the received memory configuration parameters defining selection of the number or type of memory subsystems;
a content addressable memory (CAM) interface configurable in response to received CAM configuration parameters for data communication with a selectable number or type of CAM subsystems, the received CAM configuration parameters defining selection of the number or type of CAM subsystems;
a host interface operable to receive configuration parameter data; and a switching fabric in data communication with the host interface to receive configuration parameters to configure operation of the switching fabric and in data communication with the PHY interface, the memory interface and the CAM interface to provide PHY configuration parameters, memory configuration parameters and CAM configuration parameters to the PHY interface, the memory interface and the CAM interface, respectively.

2. The network switching device of claim 1 wherein the switching fabric is further in data communication with the host interface to receive device configuration parameters and to communicate the device configuration parameters to the PHY Interface for communication to a physical layer device in data communication with the PHY interface and configuration of the physical layer device.

3. The network switching device of claim 2 wherein the switching fabric is further in data communication with the host interface to receive memory system configuration parameters and to communicate the memory system configuration parameters to the memory interface for subsequent communication to a memory subsystem in data communication with the memory interface.

4. The network switching device of claim 1 further comprising a packet processing interface in data communication with the switching fabric, the packet processing interface configurable in response to received packet processing parameters for data communication with a packet processing subsystem, the received packet processing parameters defining a number or type of packet processing devices for data communication.

5. The network switching device of claim 1 wherein the host interface is operative to receive reconfiguration parameter data and wherein the switching fabric is operative to receive reconfiguration parameters to selectively reconfigure operation of the switching fabric, the PHY interface, the memory interface and the CAM interface using the reconfiguration parameters.

6. The network switching device of claim 5 wherein the PHY interface is configurable using the PHY configuration parameters to support data communication with a first physical layer device having a maximum data throughput rate and reconfigurable using the received reconfiguration parameters to support data communication with second physical layer device having a data throughput rate less than the maximum data throughput rate.

7. The network switching device of claim 5 wherein the PHY interface is configurable using the PHY configuration parameters to support parallel data communication with a first physical layer device and reconfigurable using the reconfiguration parameters to support serial data communication with a second physical layer device.

8. A method comprising:
receiving at a switching fabric of a network switching device configuration parameters for data communication;
using a first set of the configuration parameters, at the switching fabric, configuring a packet processing interface for packet communication with a selectable number or type of packet processing devices, the number or type being specified by the first set of configuration parameters;
using a second set of configuration parameters, at the switching fabric, configuring a physical (PHY) interface for data communication with a selectable number of physical data communication devices, the number being specified by the second set of configuration parameters;
communicating data in the network switching device;
subsequently, receiving new configuration parameters; and
using the new configuration parameters, at the switching fabric, reconfiguring the packet processing interface for data communication with a different number or different type of packet processing devices or reconfiguring the PHY interface for data communication with a different number of physical data communication devices.

9. The method of claim 8 wherein receiving configuration parameters comprises receiving memory configuration parameters and wherein the method further comprises:
using the memory configuration parameters, at the switching fabric, configuring a memory interface for data communication with a selectable number or type of memory subsystems, the received memory configuration parameters defining selection of the number or type of memory subsystems.

10. The method of claim 9 wherein receiving configuration parameters comprises receiving content addressable memory (CAM) configuration parameters and wherein the method further comprises:
using the CAM configuration parameters, at the switching fabric, configuring a CAM interface for data communication with a selectable number or type of CAM subsystems, the received CAM configuration parameters defining selection of the number or type of CAM subsystems.

11. The method of claim 8 further comprising:
receiving at the network switching device a set of subsystem configuration parameters; and
communicating the subsystem configuration parameters from the network switching device to a data subsystem using one of the packet processing interface and the PHY interface, the data subsystem operative in response to the communicated parameters to adjust configuration of the data subsystem.

12. The method of claim 11 wherein receiving a set of subsystem configuration parameters comprises receiving PHY parameters for configuring a physical layer device in data communication with the network switching device and wherein communicating the subsystem configuration parameters comprises communicating the PHY parameters to configure the physical layer device.

13. The method of claim 12 wherein configuring the PHY interface comprises configuring the physical interface for data communication with the physical layer device.

14. The method of claim 12 wherein receiving new configuration parameters comprises receiving new PHY parameters for reconfiguring the physical layer device and further comprising communicating the new PHY parameters to configure the physical layer device and wherein reconfiguring the PHY interface comprises matching communication of the PHY interface with communication of the physical layer device.

* * * * *